United States Patent [19]

Wolter

[11] Patent Number: 4,884,422
[45] Date of Patent: Dec. 5, 1989

[54] DEVICE FOR SECURING AUTOMOBILE WHEELS AGAINST THEFT

[75] Inventor: Heinz Wolter, Meiswinkel, Fed. Rep. of Germany

[73] Assignee: DOM Sicherheitstechnik GmbH & Co KG, Bruhl, Fed. Rep. of Germany

[21] Appl. No.: 150,405
[22] PCT Filed: Jun. 13, 1986
[86] PCT No.: PCT/GB86/00344
 § 371 Date: Jan. 25, 1988
 § 102(e) Date: Jan. 25, 1988
[87] PCT Pub. No.: WO87/07687
 PCT Pub. Date: Dec. 17, 1987
[51] Int. Cl.$^4$ ............................................. F16B 41/00
[52] U.S. Cl. .......................................... 70/165; 70/169; 70/231
[58] Field of Search .................. 70/231, 232, 166–169, 70/173, 163, 229, 230, 165, 449, 373, DIG. 57

[56] References Cited

U.S. PATENT DOCUMENTS

| 1,430,837 | 10/1922 | Oakes | 70/169 |
| 1,564,883 | 12/1925 | Muzzio | 70/365 |
| 1,625,901 | 4/1927 | Lay | 70/231 |
| 1,633,639 | 6/1927 | Johns | 70/231 |
| 1,741,593 | 12/1929 | Trautner | 70/231 |
| 1,929,679 | 10/1933 | Duncan | 70/259 |
| 1,977,493 | 10/1934 | Scott | 70/172 |
| 2,226,499 | 12/1940 | Ledin | 70/216 |
| 2,534,446 | 12/1950 | Howard | 70/231 |
| 3,802,231 | 4/1974 | Pig | 70/231 X |
| 3,807,204 | 4/1974 | Cucheran | 70/231 |
| 3,813,904 | 6/1974 | Wallskog | 70/169 |
| 3,978,698 | 9/1976 | Ono | 70/231 X |
| 4,574,602 | 3/1986 | Furuse | 70/232 |

FOREIGN PATENT DOCUMENTS

| 0039855 | 11/1981 | European Pat. Off. . |
| 933523 | 4/1948 | France . |
| WO80/00180 | 2/1980 | PCT Int'l Appl. . |
| 310932 | 2/1930 | United Kingdom . |
| 1499794 | 2/1978 | United Kingdom . |

Primary Examiner—Lloyd A. Gall
Attorney, Agent, or Firm—Barry E. Deutsch

[57] ABSTRACT

The device comprises a sleeve (10,10') which serves to cover the polygonal head (4) of a wheel nut or bolt. The sleeve supports a lock cylinder (18) from which a locking member (28,36) projects for co-operating with a radial shoulder (6,6') formed in the head (4). The locking member (28,36) is retracted by means of a key (24) rotating the cylinder plug (20,20'). The sleeve (10,10') can be pushed on to the head (4) without using the key (24). The locking member (28,36) may be constituted by a latch (28) or annular spring (36).

6 Claims, 5 Drawing Sheets

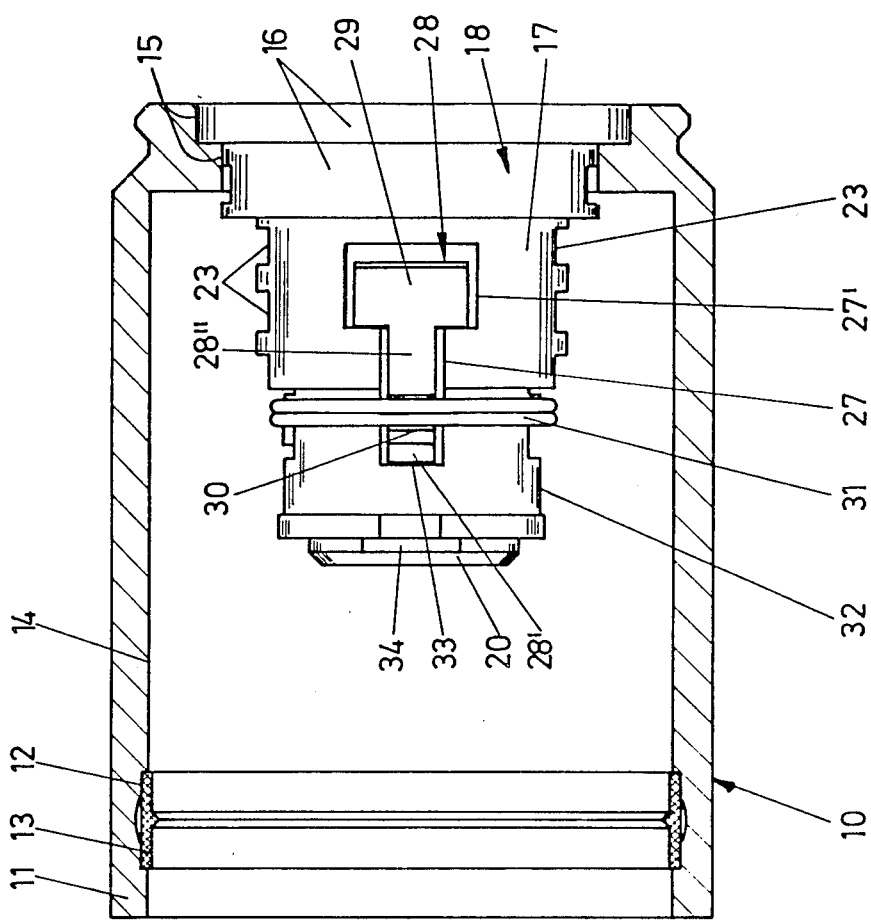
FIG. 4
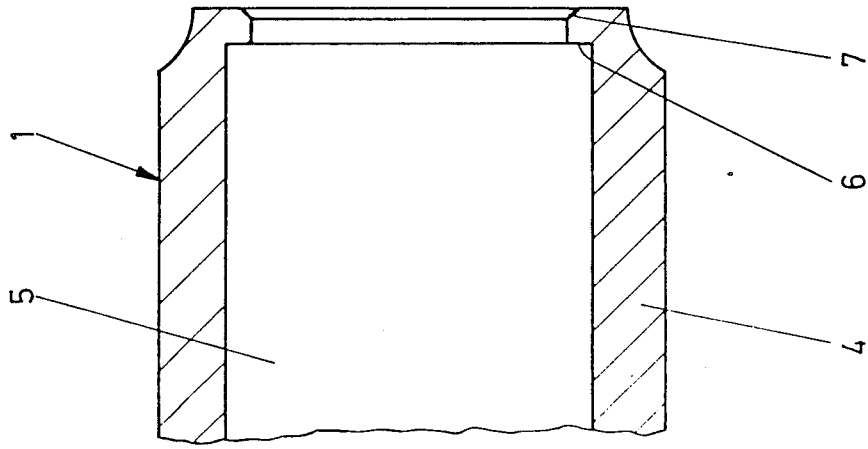

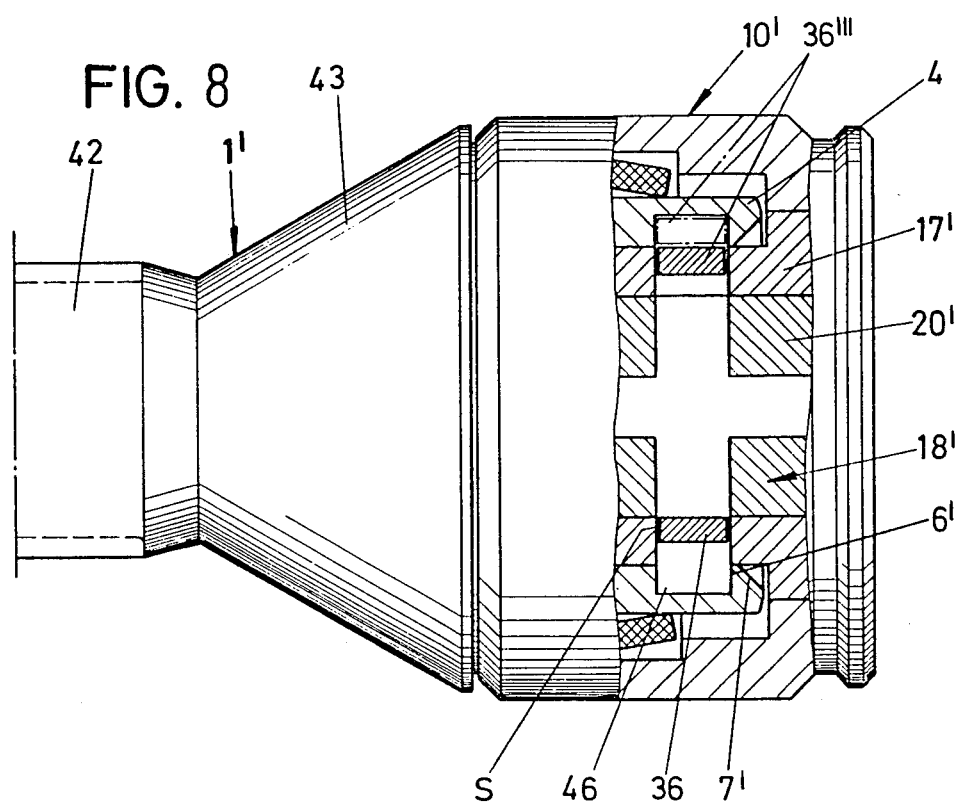
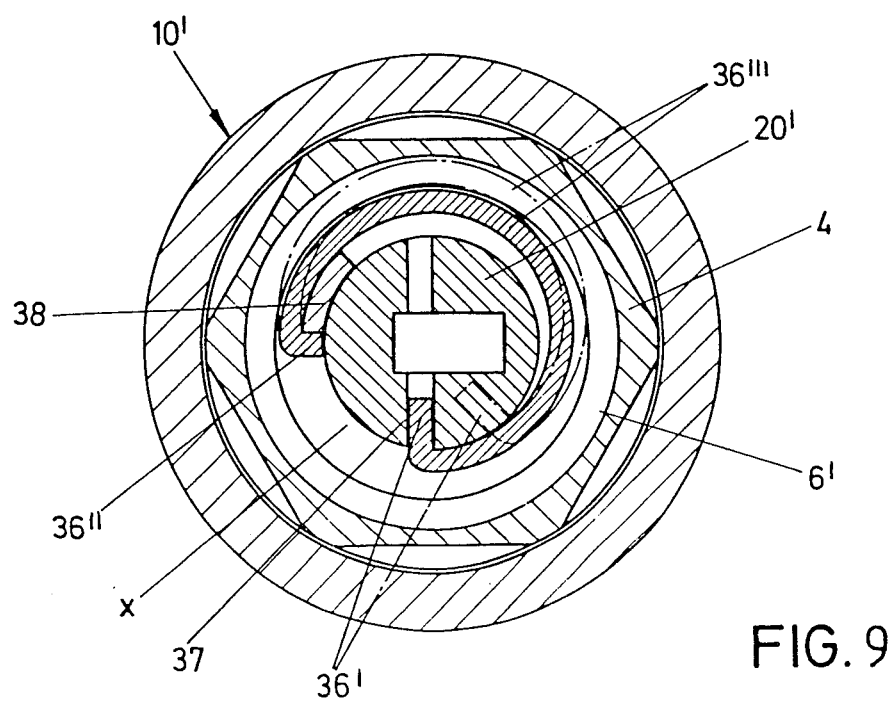

DEVICE FOR SECURING AUTOMOBILE WHEELS AGAINST THEFT

BACKGROUND OF THE INVENTION

The invention is concerned with a device for securing automobile wheels from theft, comprising a sleeve which embraces the polygonal head of a wheel nut or bolt, which sleeve is rotatable on the polygonal head and cooperates with a lock cylinder the cylinder plug of which, providing the keyway, controls a locking member with which is associated a radial shoulder for engagement by the locking member, wherein the engagement position of the latter in relation to the radial shoulder is released by rotation of the cylinder plug by a key.

Such a construction is known from U.S. Pat. No. 1,534,446, wherein the polygonal head receives directly the cylinder plug and has diametrically opposed longitudinal slots for the tumblers. The free end of the polygonal head forms a cylindrical stepped-down section and contains therein a slot which extends in the circumferential direction for mounting the locking member which is secured there by a pin. This means that the lock cylinder is itself a component part of the wheel nut or bolt. Because of the multiple slotting the polygonal head has a weakness. Further, the lock cylinder ca be damaged when screwing and unscrewing the polygonal head. After the wheel nut or bolt has been put on, the sleeve has to be pushed onto the polygonal head. In order to secure this in the applied position, the key must be operated to turn the cylinder plug so that it pivots the locking member in order that the latter can extend into the annular groove of the sleeve, forming the radial shoulder. If the sleeve is not pushed on sufficiently far, it may be that the locking member pivots out into the region in front of the annular groove. The sleeve is then not secured against removal.

Based upon the subject matter of the invention is the object of so constructing, in a manner which is simple in terms of production technology, a device of the type set out above that, in addition to the lock cylinder being treated less roughly, applying and securing the sleeve can be facilitated.

SUMMARY OF THE INVENTION

This object is resolved in accordance with the present invention, in a device as set out in the first paragraph above, in that the locking member, which is spring-urged outwardly from the cylinder plug, is in the form of a latch member which snaps in behind the radial shoulder when the sleeve is pushed on to the polygonal head.

As a result of this construction the device is provided with enhanced value in use. The lock cylinder is no longer itself a component part of the wheel nut or bolt. Therefore it is exposed to no danger of damage when screwed on or off. The polygonal head is not weakened by openings extending therethrough. Furthermore, the application of the sleeve containing the lock cylinder can be undertaken without operating the key, more particularly merely by pushing onto the polygonal head. During this application movement the locking member yields resiliently. As soon as the locking member lies in the region behind the radial shoulder of the polygonal head, it can snap in. This latter is clearly audible, so that the applied position is ensured with certainty. This simple mounting of the device leads in turn to a saving in time. The removal of the sleeve can be undertaken only after operation of the key, the locking member having to be guided by the cylinder plug into a release position. By means of a single key several sleeves provided with a lock cylinder can be removed, so that e.g. for a set of sleeves only one key, plus a replacement key, need be supplied.

An advantageous construction is to be seen in that the locking member is in the form of a double-armed latch which extends in the longitudinal direction of the lock cylinder and has a latch head arranged at one end, and further which, in the region of the other latch arm, is embraced by an annular spring extending circumferentially round the cylinder plug. Since the locking member now lies in the region of the tumblers, the device can be of short and light construction. Accordingly, the length is determined only by the length of the lock, and a greater number of tumblers can be introduced for increasing the security of the lock. Also favourably a sealing can be applied to all the operative parts.

In this context it is of advantage that the annular spring lies in an outwardly open recess of the locking member. Thus it does not project beyond the locking member in the radial direction, which acts against a space-saving construction.

Advantages from the point of view of control technology arise in that a run-in inclined surface of the polygonal head is arranged outwardly of the radial shoulder. When the sleeve is pushed on, a progressive yielding movement of the latch then takes place.

A greater support surface is achieved in that the latch head is broad in the circumferential direction in relation to the shaft of the latch member. Larger withdrawal forces engaging it can therefore be accommodated without danger.

Another variant is characterised in that the locking member is in the form of, an annular leaf spring which extends circumferentially around the cylinder plug, the diameter of which can be reduced by rotation of the cylinder plug, and which, in its untensioned condition where the diameter is greater, projects outwardly for co-operation with the radial shoulder with a part-section of its length. From this there results a saving of components. The annular leaf spring now itself provides the locking member. During the application movement of the sleeve the run-in inclined surface of the polygonal head effects a reduction in the diameter of the annular leaf spring. Then, when it moves in front of the radial shoulder, it can relax and secure the sleeve against withdrawal. The withdrawal of the sleeve then requires the insertion of a key appropriate to the lock cylinder.

Finally it is again of advantage that the one inwardly angled end of the annular leaf spring engages behind an abutment which lies spaced from the other end of the annular leaf spring fixed to the plug, by a distance of about a quarter of a circle. The use of space is thus at an optimum. Preferably the abutment is formed by a projection at the side of the housing for the lock cylinder.

Hereinafter are described, with reference to the accompanying drawings, two exemplary embodiments of the invention which have been selected for description by way of non-limiting example.

BRIEF DESCRIPTION OF THE DRAWINGS

FIG. 4 is a longitudinal section of FIG. 3, on an enlarged scale;

FIG. 8 is a view, partly in section, of the device according to the second embodiment, showing the sleeve applied to the wheel nut; and FIG. 9 is a cross-section through the device of FIG. 8 in the region of the locking member, which is in the form of an annular leaf spring.

DESCRIPTION OF THE PREFERRED EMBODIMENTS

Figures 1, 2:
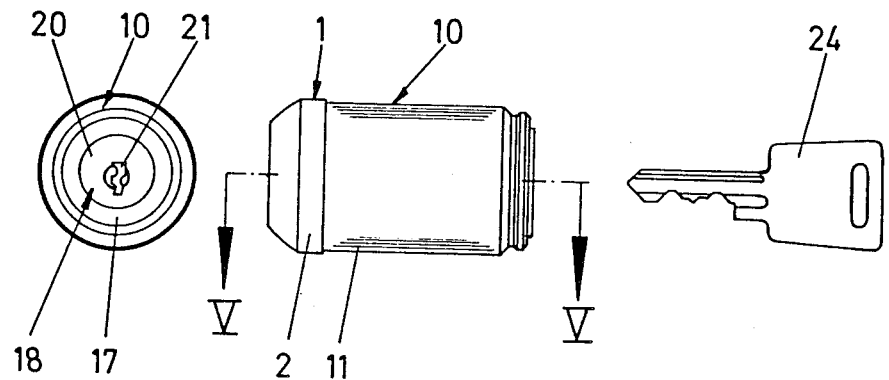
FIG. 1 is a general view of the device according to the first embodiment, together with its associated key.
FIG. 2 is a front view of FIG. 1.
Figure 3:
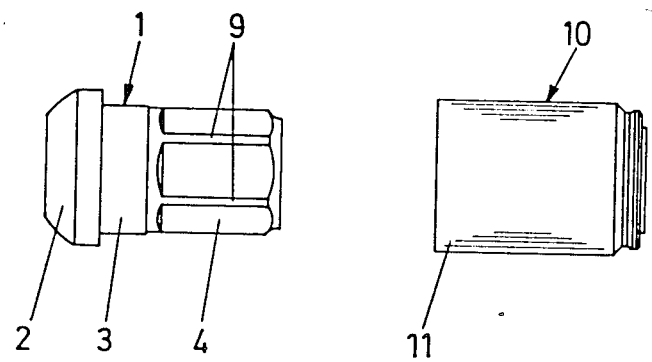
FIG. 3 is a view showing the sleeve separated from the wheel nut.

In accordance with the first exemplary embodiment, shown in FIGS. 1 to 7, a wheel nut is designated with the numeral 1. This nut has a head 2 which is circular in cross-section together with a plug section 3 and, adjacent this, a polygonal (actually hexagonal) head 4. From the free end of the polygonal head 4 extends an axial bore 5 (FIG. 4). This forms in the region of the end face opposite the head 2 a radial shoulder 6 beyond which extends a run-in inclined surface 7.

The polygonal head 4 adjacent the plug section 3 is provided with rounded corners 9. A sleeve 10 serves to cover the polygonal head 4, which with its corners 9 provides a rotational mounting for the sleeve 10, the latter having a bore 14 of such dimension that it can receive the polygonal head 4. The end 11 of the sleeve 10, at the side where it is pushed on, extends up to the head 2 when the sleeve is pushed on. Arranged adjacent the end 11 within the bore 14 is an internal annular groove 12. In said groove is inserted a sealing ring 13 which, when the sleeve 10 is pushed on, sealingly grips the plug section 3.

At the end of the bore 14 remote from the groove 12 is a stepped bore section 15. Frictionally engaged therein is a stepped flange 16 of a housing 17 of a lock cylinder 18. The lock cylinder housing 17 has a central plug bore 19 (FIGS. 6 and 7) for receiving a cylinder plug 20. The latter is fixed against movement in the radial direction within the lock cylinder housing 17. The cylinder plug 20 is provided with a keyway 21 passing therethrough for receiving a key 24. Extending obliquely to the keyway 21 in the cylinder plug 20 are wafer-type tumblers 22 with which are associated diametrically opposed openings 23 in the lock cylinder housing 17. When the key 24 is not inserted, ends of the wafer-type tumblers 22 engage in the openings 23 and prevent rotation of the cylinder plug 20 relative to the lock cylinder housing 17. When the key 24 is inserted into the keyway 21, the ends of the wafer-type tumblers 22 are withdrawn from the openings 23 so that the cylinder plug can be rotated in known manner in the lock cylinder housing 17. The friction arising between the cylinder plug 20 and the lock cylinder housing 17 is less than the friction arising between the flange 16 of the cylinder housing 17 and the bore section 15 of the sleeve 10, so that upon rotation of the key 24 only the cylinder plug 20 is moved therewith.

Figure 5:
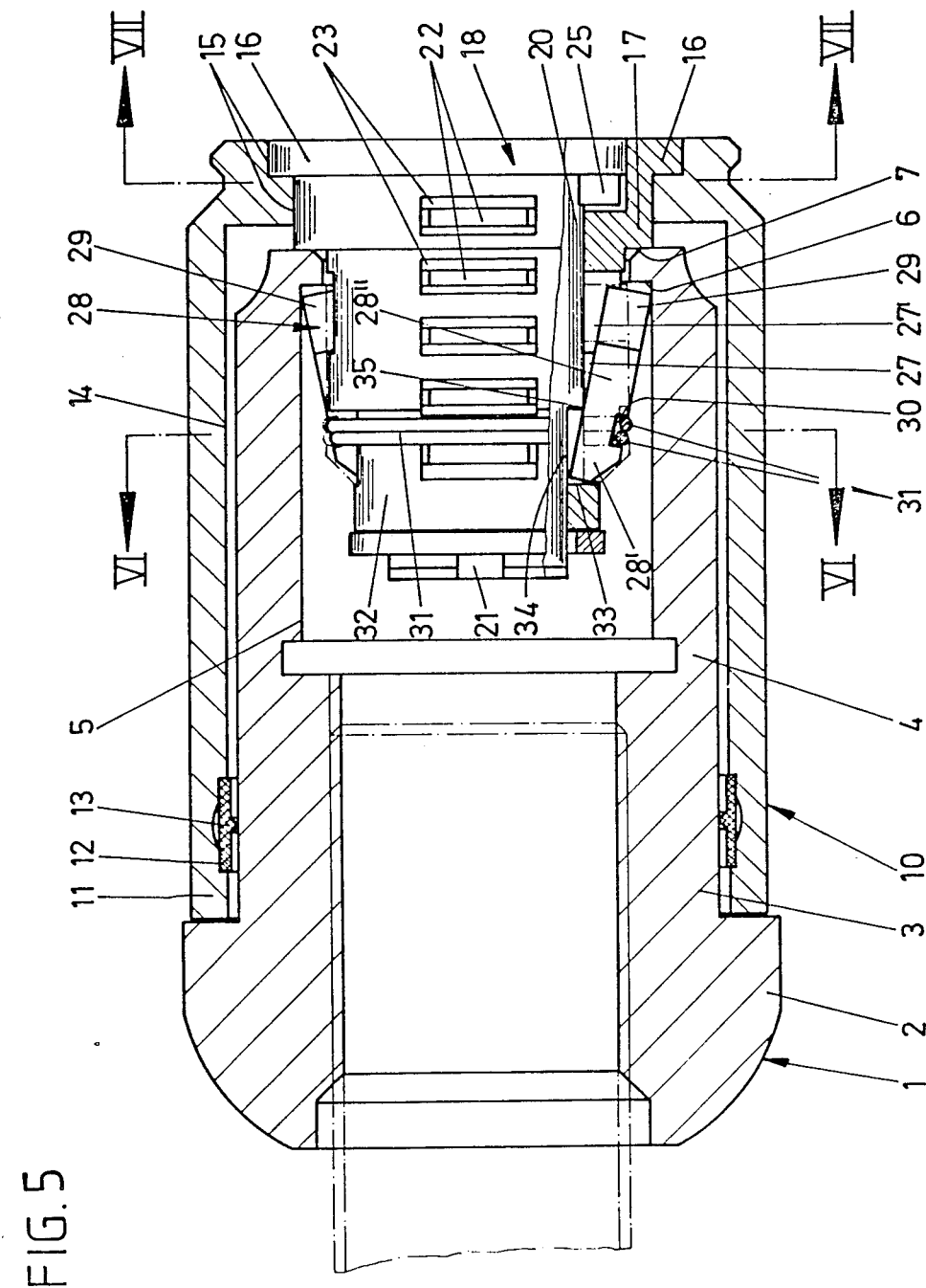
FIG. 5 is the section along the line V—V in FIG. 1.
Figure 7:
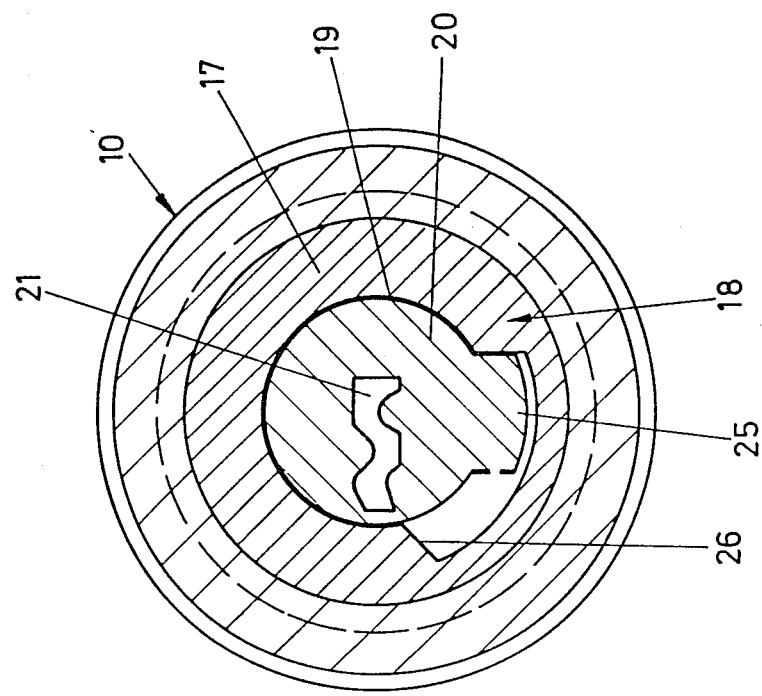
FIG. 7 is the section along the line VII—VII in FIG. 5.

The flange 16 of the cylinder plug 20 has formed thereon a radially extending projection 25 (FIGS. 5 and 7). This cooperates with an abutment 26 of the lock cylinder housing 17. The abutment 26 is arranged at such an angle of rotation to the projection 25 that only a 45° rotation of the cylinder plug 20 can be effected (see FIG. 7).

In the cylinder housing 17, offset by 90° to the openings 23, are formed apertures 27 which, towards the flange 16, run into a wider aperture section 27' (see FIG. 4). In each aperture 27 is accommodated a double-armed latch member 28 which extends longitudinally of the lock cylinder 18. This constitutes the locking member. At one end the latch member has a latch head 29 which is broad in relation to the latch shaft, said head 29 moving within the aperture section 27' of the lock cylinder housing 17. The latch shaft extending from the latch head 29 is embraced by an annular spring 31 having two coils, said spring engaging in an outwardly open recess 30 of the latch shaft. For receiving the annular spring 31, the lock cylinder housing 17 in the corresponding region has a stepped-down annular zone 32. By the annular spring 31 engaging on the latch member 28 the latch shaft is divided into two latch arms 28' and 28". The shorter latch arm 28' abuts against a shoulder 33 of the lock cylinder housing 17 (see FIG. 5), while the longer latch arm 28" is integral with the latch head 29.

Figure 6:
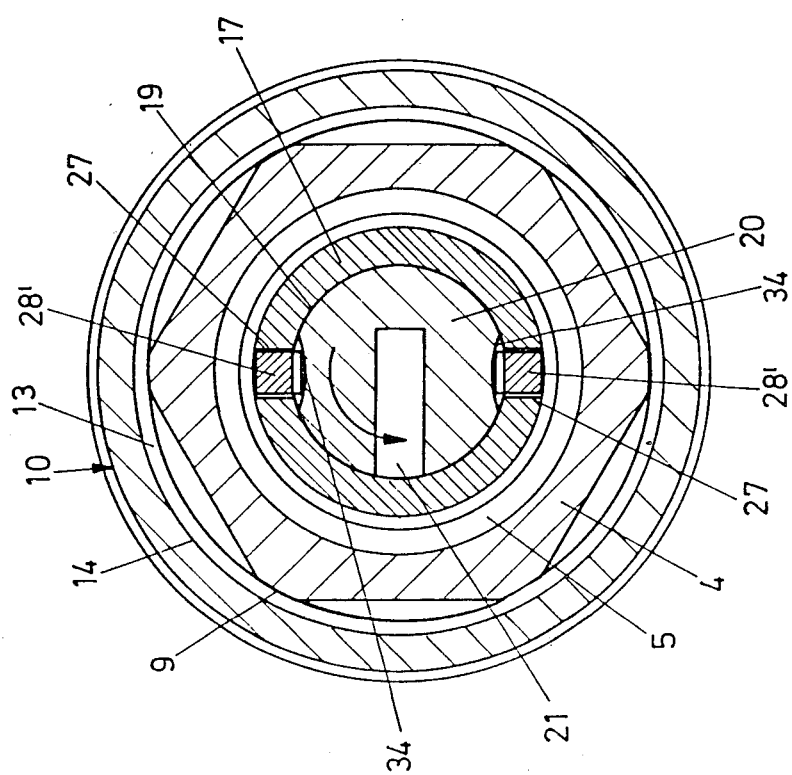
FIG. 6 is the section along the line VI—VI FIG. 5.

When the key 24 is withdrawn, and thus the lock cylinder 18 is in locking position, the latch arms 28' rest on the floor of the apertures 34 of the cylinder plug 20 (see FIGS. 5 and 6). A further support point is formed by an edge 35 between the aperture 34 and the outer surface of the cylinder plug 20, so that the locking member 28 is in a precisely defined position.

When the polygonal head 4 is to be covered by the sleeve 10, the latter has to be pushed onto the polygonal head. In so doing, the latch head 29 is progressively engaged by the run-in inclined surface 7 of the polygonal head 4 and the locking member 28 is thus swung against its spring-loading. Upon further pushing, the latch head 29 then moves beyond the radial shoulder 6, so that the locking member 28 snaps, under the influence of the spring 31, into the position shown in FIG. 5, behind the radial shoulder. The sleeve 10 is now secured against withdrawal by means of the lock cylinder 18 which projects into the bore 5. Pulling forces applied to the sleeve 10 lead to abutment of the locking members 28 against the radial shoulder 6, which members for their part are supported on the shoulders 33 of the lock cylinder housing 17. Nevertheless the sleeve 10 is capable of rotation on the polygonal head 4.

The removal of the sleeve 10 requires the key 24. By means thereof the cylinder plug 20, starting from the position shown in FIG. 6, is rotated in the direction of the arrow. The shorter latch arms 28' then leave the apertures 34 and engage on the outer surface of the cylinder plug 20. As a consequence, latch heads 29 of the locking members 28 are pivoted inwards into the body of the housing 17 so that they can no longer engage with the radial shoulder 6 of the polygonal head 4. The sleeve 10 together with the lock cylinder 18 as a composite unit can now be removed from the polygonal head.

In accordance with the second embodiment, shown in FIGS. 8 and 9, a wheel bolt 1' is made secure. This has a threaded shaft 42 which runs into a tightening cone portion 43. Adjacent this is disposed a polygonal head 4 which has an inside annular groove 46 adjacent its free end. The groove 46 thus forms a radial shoulder 6'. The run-in inclined surface 7', which in this case is of larger dimensions than in the first embodiment, cooperates with a locking member 36 which is in the form of an annular leaf spring which extends circumferentially around the cylinder plug 20' and the diameter of which can be reduced by rotation of the cylinder plug. The leaf spring has a securing end 36' which is bent inwards towards the plug and which projects into a cross-slot 37 of the cylinder plug 20' and is anchored therein. The other securing end 36" of the annular leaf spring 36, which is likewise bent inwards, engages an abutment 38 of the lock cylinder housing 17' and lies spaced from the securing end 36' by a distance x of about a quarter of a circle.

The width of the annular leaf spring 36 is somewhat narrower than the width of the annular groove 46 of the polygonal head 4.

When the key is not inserted, the annular leaf spring 36 is in its relaxed condition, (as shown in chain-dot line), in which it extends beyond the lock cylinder housing 17' with a part-section 36'''. If the sleeve 10' in this position is now pushed on the polygonal head 4, one edge S of the annular leaf spring 36 engages the run-in inclined surface 7'. This leads to a reduction of diameter of the annular leaf spring 36, so that the sleeve 10' can then be fully pushed on, in which position the annular leaf spring 36 can relax and snap into the annular groove 46 of the polygonal head 4 (also as shown in chain-dot line), achieving a positive lock. The distance x of a quarter of a circle allows the yielding movement for the one securing end 36" of the annular leaf spring 36. The removal of the sleeve takes place by means of an appropriate key. This turns the cylinder plug into the position shown in full line in FIGS. 8 and 9, the part-section 36''' leaving the annular groove 46 of the polygonal head. The sleeve together with the lock cylinder 18' can then be removed.

Also in this embodiment, when the sleeve together with the annular leaf spring 36 in its non-tensioned condition is mounted on the polygonal head, an audible signal arises when the annular leaf spring engages with force in the annular groove 46. In order to maintain a continuous yielding of the annular leaf spring, the run-in inclined surface may be in the form of a spiral, thus increasing in depth.

It is further possible to provide several such annular leaf springs 36 one behind the other. In this case the polygonal head would have to be provided with a corresponding number of annular grooves lying one behind the other, each annular groove then additionally having a run-in inclined surface.

I claim:

1. Device for securing automobile wheels against theft, comprising:
   a sleeve surrounding a polygonal head of a wheel nut or bolt, said sleeve being rotatable on said head and including a lock cylinder having a cylinder plug providing a keyway;
   a locking member;
   an inwardly extending radial shoulder on said wheel nut or bolt engaged by the locking member when the sleeve is pushed on the polygonal head, with rotation of said plug through a key inserted into said keyway disengaging said locking member from said radial shoulder;
   said locking member comprising a double arm latch which extends in the longitudinal direction of the lock cylinder and includes a latch head arranged at one end, with the other end of said latch being engaged by an annular spring extending circumferentially around the cylinder plug.

2. Device according to claim 1 characterized in that the latch head is broad in the circumferential direction in relation to a shaft of the locking member.

3. Device according to claim 1 characterized in that a run-in inclined surface of the polygonal head is arranged axially outwardly of the radial shoulder.

4. Device according to claim 3 characterized in that the annular spring lies in an outwardly open recess of the locking member.

5. Device according to claim 4 characterized by several locking members arranged symmetrically in relation to one another and embraced by a common annular spring.

6. Device according to claim 5 characterized in that the latch head is broad in the circumferential direction in relation to a shaft of the latch member.

* * * * *